MULTIVIBRATOR CIRCUITS HAVING A WIDE RANGE OF CONTROL

Filed July 11, 1963 2 Sheets-Sheet 1

INVENTOR.
FRANK W. WEBER
BY
Christie, Parker & Hale
ATTORNEYS.

July 12, 1966 F. W. WEBER 3,260,857

MULTIVIBRATOR CIRCUITS HAVING A WIDE RANGE OF CONTROL

Filed July 11, 1963 2 Sheets-Sheet 2

INVENTOR.
FRANK W. WEBER
BY
Christie, Parker & Hale
ATTORNEYS.

United States Patent Office 3,260,857

Patented July 12, 1966

3,260,857
MULTIVIBRATOR CIRCUITS HAVING A WIDE RANGE OF CONTROL

Frank W. Weber, Duarte, Calif., assignor to Burroughs Corporation, Detroit, Mich., a corporation of Michigan Filed July 11, 1963, Ser. No. 294,293
7 Claims. (Cl. 307—88.5)

This invention relates to multivibrator circuits and, more particularly, to multivibrator circuits having an extremely wide range of control.

Multivibrator circuits generally employ vacuum tubes or transistors connected as amplifying stages or as switching stages with coupling circuits therebetween to effect alternate operation of the stages. In a monostable multivibrator, for example, one of the stages is normally conducting or closed while the other stage is normally off. Also, one of the coupling circuits is generally an alternating-current feedback path from one stage to the other, while the other coupling circuit effects direct-current coupling. The monostable multivibrator has two states of operation, which are its normal state or stable state and its timing state or quasi-stable state. When a monostable multivibrator is operating in its normal state, there is required an external trigger pulse to cause the multivibrator to change states. Thereafter, the output of the multivibrator is normally taken from the normally conducting stage so that the output pulse generally has a duration determined by the period of the quasi-stable or timing state.

An astable multivibrator operates in a similar manner. Notably in an astable multivibrator, both coupling circuits are alternating-current feedback paths from one stage to the other rather than one being a direct-current path.

In multivibrator circuits, it is possible to vary the width of the output pulse or the delay time of the multivibrator by varying one of the parameters in the alternating-current coupling circuit. However, the variation of a single parameter encounters practical limitations so that the range of variation is generally limited. For example, some of the alternating-current coupling circuits primarily comprise a timing capacitor with resistors connected in the charging path between the capacitor and a source of potential. Thereafter, to vary the pulse width or delay time, it is possible to vary the value of the capacitance, or to vary the charging current available by varying the resistance of the resistors, or by changing the voltage increment through which the capacitor has to charge. However, variable capacitors are not readily available in the large capacitances which are required for long delay times nor are large variations of the current or voltage increments permissible because of the effect upon the operation of the active stages.

Therefore, in accordance with the invention, a multivibrator circuit having an extremely wide range of variation possible in the pulse width of the output signal or the delay time of the multivibrator comprises a first electrically sensitive stage and a second electrically sensitive stage. The multivibrator further comprises a coupling means connected between the stages for making the first stage responsive to the operation of the second stage. The coupling means includes a capacitive network and a single means for simultaneously varying the effective capacitance of the network and the current passing through the network.

These and other features and advantages of the present invention will be understood more clearly and fully upon consideration of the following specification and drawing in which.

Figure 1:
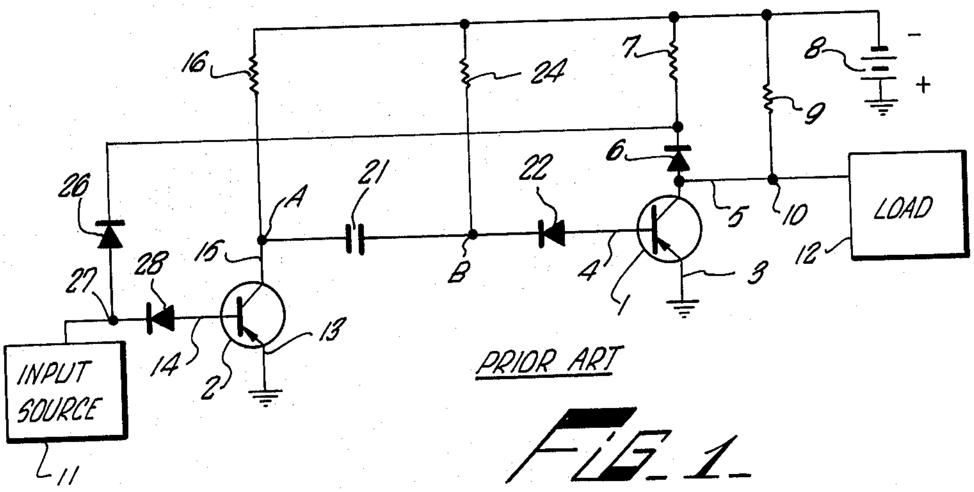
FIG. 1 is a schematic diagram of a prior art monostable multivibrator circuit.

A typical prior art monostable multivibrator circuit is shown in FIG. 1 as a point of reference for the understanding of the basic operation of multivibrators.

Even though the invention is described in connection with transistorized monostable multivibrator circuits, it is not, in any way, limited to such circuits. For example, the multivibrator could be astable and the amplifiers could employ vacuum tubes. Further the two stages of the multivibrator could comprise relays and their associated contacts. In any case, the multivibrator basically comprises two electrically sensitive stages and at least one alternating-current coupling circuit between the stages.

The monostable multivibrator of FIG. 1 includes an amplifier stage 1, which is normally in its conductive state; and an amplifier stage 2, which is normally in its nonconductive state. Amplifier stage 1 includes a transistor as the active element which has an emitter 3, a base 4 and a collector 5. Emitter 3 is connected directly to ground reference and collector 5 is connected through a diode 6 and a resistor 7 to the negative terminal of a source of potential 8. Collector 5 is also connected through a resistor 9 to the source of potential and to an output terminal 10. The normally off amplifier stage includes, as the active element, a transistor having an emitter 13, a base 14 and a collector 15. The emitter 13 is connected directly to ground reference and the collector 15 is connected through a resistor 16 to the negative terminal of source 8. The base 14 is connected to an input terminal 27 through a diode 28.

An alternating-current coupling circuit is connected between the two amplifier stages and comprises a capacitor 21 connected to collector 15 and a diode 22 connected to base 4. A junction point B between capacitor 21 and diode 22 is connected through a resistor 24 to source 8. In addition to the alternating-current coupling circuit, there is a direct-current coupling circuit between the base 14 of the normally off amplifier stage 2 and the collector 5 of the normally on amplifier stage 1. The direct-current coupling circuit comprises a diode 26.

The normal state or stable state of the multivibrator shown in FIG. 1 is when amplifier stage 1 is in its conducting state. This state will exist until a trigger pulse is applied to input terminal 27 from input source 11. When a negative pulse is applied to this input terminal, amplifier stage 2 will be biased in its on condition. When amplifier stage 2 turns on, it will act essentially like a switch to place ground reference on collector 15 at point A. The potential that existed prior to the turning on of amplifier stage 2 at point A was approximately equal to the negative potential from source 8. Thus, the nearly instantaneous change of the potential at point A will cause a nearly instantaneous change of the potential at point B, thus turning amplifier stage 1 off. The turning off of amplifier stage 1 will remove what was essentially ground reference from the collector 5 so that the collector 5 will now become increasingly negative. The negative potential appearing at collector 5 is coupled through diode 26 to the base 14 of amplifier stage 2 to hold this amplifier on during the time of the selected delay period. The removal of the ground reference from collector 5 and the application of the negative potential will cause an output signal to appear at output terminal 10, which is applied to load 12. This output signal will exist for the delay period or set time of the multivibrator circuit. The delay period of the multivibrator circuit is determined primarily by the time constant of the series combination of resistor 24 and capacitor 21 in the alternating-current coupling circuit. An additional factor enters into the determination of this delay period and it is dependent upon the voltages which exist at points A and B and the supply voltage from source 8. However, for the purposes of understanding this invention, it will be assumed that this latter factor is a constant and the delay time is thus determined primarily by the time constant presented by resistor 24 and capacitor 21.

Figure 2:
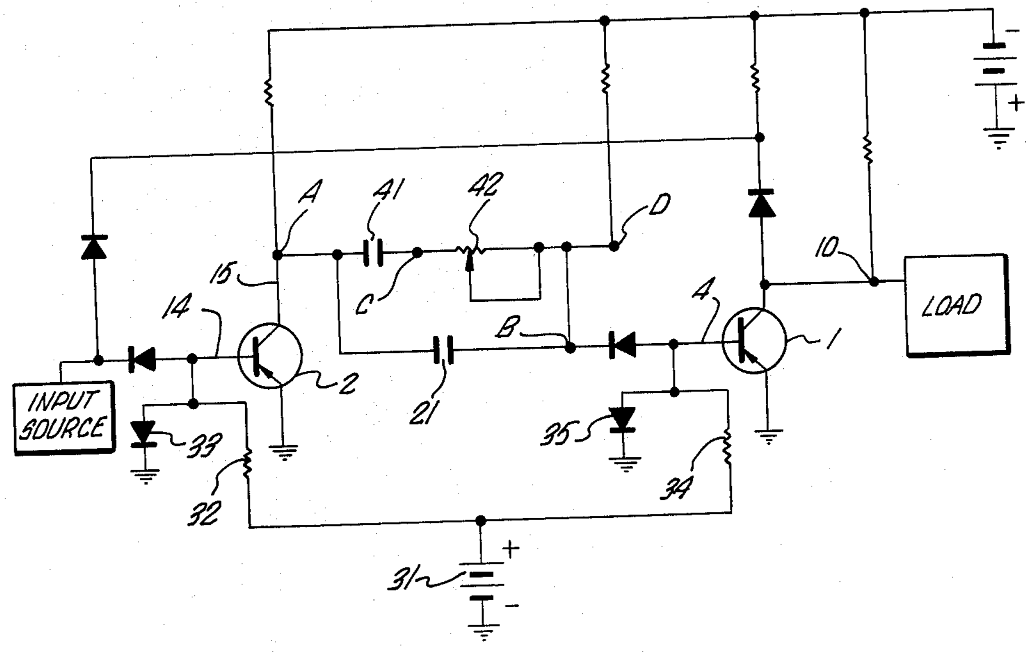
FIG. 2 is a schematic diagram of a monostable multivibrator circuit in accordance with the present invention.

Now referring to FIG. 2, a monostable multivibrator circuit having a wide range of variable control is shown in schematic form. The circuit of FIG. 2 is similar to the multivibrator circuit shown in FIG. 1. However, an additional biasing circuit is included which comprises a source 31 connected in parallel to two voltage divider circuits. One voltage divider circuit includes a resistor 32 and a diode 33. The junction of resistor 32 and diode 33 is connected to base 14 of amplifier stage 2. The second voltage divider circuit comprises a resistor 34 and a diode 35. The junction between the resistor 34 and diode 35 is connected directly to base 4 of amplifier stage 1. This biasing circuit is included to insure the complete cutoff of the amplifier stages when they are in their nonconducting state. For purposes of understanding the operation of the multivibrator circuits, in accordance with the invention, this bias circuit can be excluded.

The alternating-current coupling circuit between the collector 15 of amplifier stage 2 and the base 4 of amplifier stage 1 includes a series combination of a capacitor 41 and a resistor 42. The capacitor and resistor series combination is connected directly in parallel with capacitor 21. As stated in connection with FIG. 1, the delay time or set time of the multivibrator circuit is determined by the time constant of the resistive-capacitive network in the coupling circuit. The combination of capacitors 21 and 41, and variable resistor 42 simulates a capacitor which is variable over a range of capacitance substantially from the value of capacitor 21 alone to the sum of the two fixed capacitors.

Figure 3:
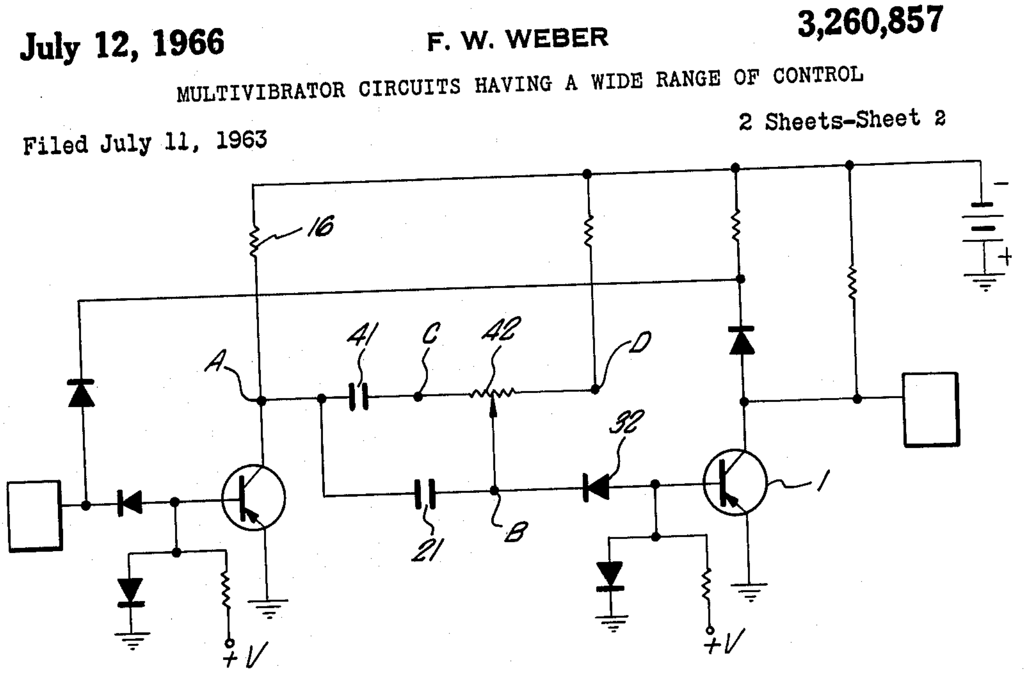
FIG. 3 is a schematic diagram of a preferred embodiment of a monostable multivibrator circuit in accordance with the present invention.

A preferred embodiment of the alternating-current coupling circuit between the amplifiers of the multivibrator circuit is shown in FIG. 3. Therein, the wiper arm of variable resistor 42 is connected to one side of capacitor 21. Thereafter, any adjustment of the value of resistance presented by resistor 42 will not only vary the magnitude of the effective capacitance in the coupling circuit, but will also vary the magnitude of the charging current available for the two capacitors.

As the wiper arm of variable resistor 42 is moved to the left, the value of the capacitance effectively present in the coupling circuit will be increased. In addition, the resistance in the current path of capacitor 21 will also be increased. Therefore, both the resistance and the capacitance in the determination of the set or delay time are increased by moving the arm to the left and both are decreased by moving the arm to the right. Thus, a single movement of the wiper arm of resistor 42 will increase or decrease both the resistive and the capacitive parameters to effect a large change in the delay time.

Figure 4:
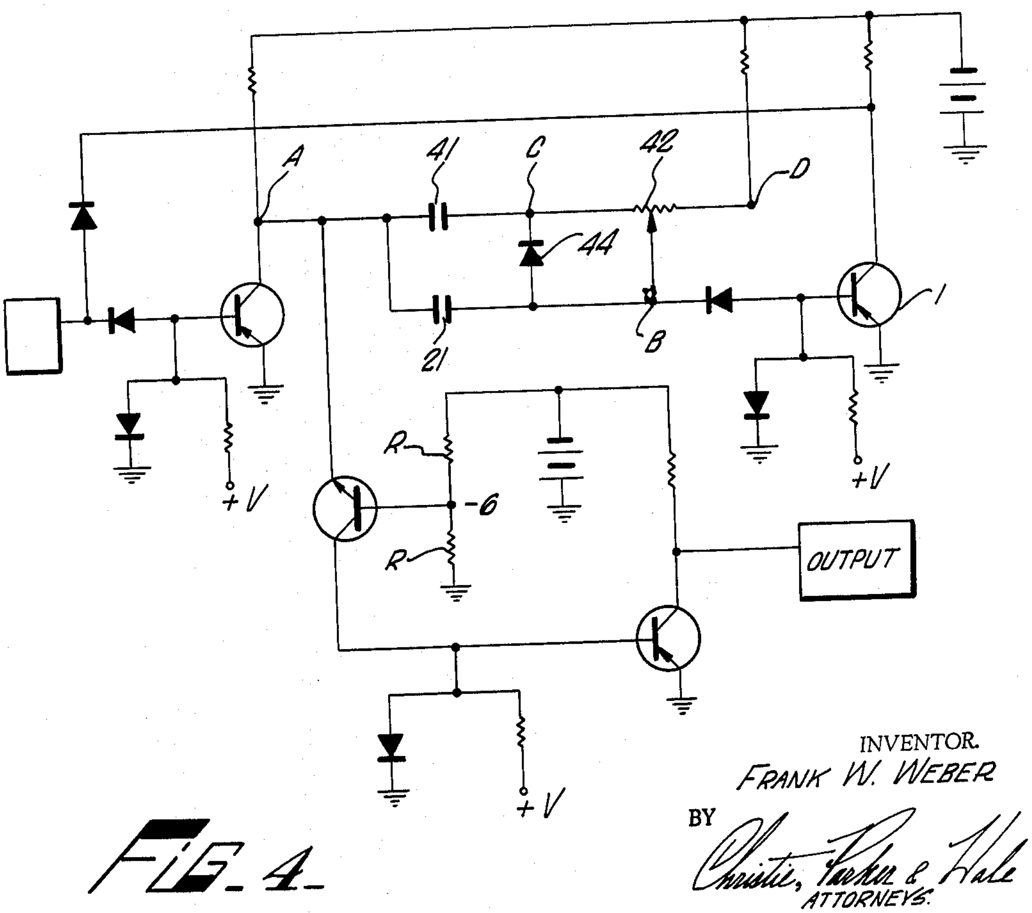
FIG. 4 is a schematic diagram of a modification to the preferred embodiment of a monostable multivibrator circuit shown in FIG. 3.

A modification to the preferred embodiment of FIG. 3 is shown in FIG. 4. For the proper operation of monostable multivibrator circuits, it is desired that the coupling circuit between the amplifier stages return completely to its normal state before the application of the next trigger signal to the circuit. Thus, the multivibrator circuit has what is termed a reset time during which the capacitor in the coupling circuit returns to its normal state. It is generally assumed that the capacitive circuit will return to its normal state in approximately five time constants.

Referring to the multivibrator circuit shown in FIG. 1, it is seen then that the reset time is approximately equal to five times the time constant of the series path of resistor 16 and capacitor 21, because capacitor 21 charges through the emitter-base junction of transistor 1 and diode 22 and resistor 16 to source 8. For purposes of analysis, it can be assumed that diode 22 and the emitter-base path of transistor 1 present substantially zero resistance. Therefore, the equation for the reset time will, in general, be:

$$\text{Reset Time} = 5 \times \text{Resistance of Resistor } \mathbf{16} \times \text{Capacitance of Capacitor } \mathbf{21}$$

Applying this equation to the multivibrator circuit of FIG. 3 and assuming zero resistance across diode 22 and emitter-base junction of transistor 1, the reset time of the circuit may be determined. It is seen in FIG. 3 that capacitor 21 has essentially the same charge path through resistor 16 and diode 22 and transistor 1 as does the capacitor 21 of FIG. 1. However, capacitor 41 has the additional resistance of resistor 42 in its charge path. Therefore, capacitor 21 may be completely reset and ready for the next input trigger pulse while the condition of capacitor 41 is uncertain. Therefore, as shown in FIG. 4, a modification is made to the preferred embodiment, which comprises the connecting of a diode 44 directly between capacitor 21 and capacitor 41. Thereafter, when the capacitors are charging after the delay period has ended, the capacitors will effectively be connected in parallel so that capacitor 41 will follow capacitor 21. Thus, both capacitors will be reset at the same time and will be concurrently ready for the next input pulse.

An additional modification to the monostable multivibrator circuit is shown in FIG. 4. When the output signal is taken from the normally conducting amplifier stage 1, additional requirements are placed upon the coupling circuit which controls the operation of this amplifier stage. That is, the coupling circuit must draw sufficient current to turn this amplifier stage on, once it has been turned off. Additionally, it has been found to be desirable to utilize the reset time of the multivibrator in the output pulse. The advantages and desirability of including the reset time in the output pulse is disclosed and claimed in my copending patent application Serial #134,220, filed August 28, 1961, and assigned to the same assignee as this application. Thus, instead of taking the output signal from the second switching stage as shown in FIGS. 1 through 3, the output signal is taken from a second amplifier stage which is added to the multivibrator circuit as shown in FIG. 4.

What is claimed is:

1. A multivibrator having a stable state and a set state; a variable timing means in said multivibrator for selectively varying the time said multivibrator is held in said set state, said timing means comprising: a first capacitive means, a second capacitive means, resistive means series connected with said second capacitive means, means connecting one end of each of said first and second capacitive means, and means selectively variable between two limits for connecting said first and second capacitive means in a purely capacitive parallel circuit at one limit, and for connecting said first capacitive means in parallel with said series connected resistive means and second capacitive means at the other limit.

2. A multivibrator having a stable state and a set state comprising a pair of switches, each having an input circuit and an output circuit, a selectively variable alternating-current coupling circuit for coupling the output circuit of the first switch to the input circuit of the second switch and for varying the set time over a wide range, said coupling circuit including a series combination of a variable resistor and a first capacitor, a second capacitor connected in parallel with the first capacitor and a portion of the variable resistor through the adjustable arm of the resistor means for normally biasing said first switch in its off condition, means for normally biasing said second switch in its on condition, means for applying voltage impulses to said first switch to reverse the quiescent conductive states of said switches, and means for making the first capacitor electrically follow the second capacitor during the stable state.

3. In a multivibrator, a pair of switches each having an input circuit and an output circuit, an alternating-current coupling means coupling said switches including a capacitive network coupling the output circuit of a first of said switches to the input circuit of the second of said switches, said capacitive network comprising a variable resistor, a first capacitor connected in series with the whole of said variable resistor, and a second capacitor connected in parallel with the first capacitor and a variable portion of said variable resistor, resistive means providing a discharge path for said capacitive network through the variable resistor of said capacitive network, means for normally biasing said first switch in its off condition, means for normally biasing said second switch in its on condition, and means for applying voltage impulses to said first switch to reverse the quiescent conductive states of said switches.

4. A multivibrator in accordance with claim 3 wherein the coupling means includes a junction point between the first capacitor and the variable resistor, a diode connected between the second capacitor and said junction point.

5. In combination, a source of potential; a first transistor having an emitter, a collector, and a base; means for normally biasing said first transistor in a selected conduction state of two possible conduction states of substantially full conduction and no conduction; a second transistor having an emitter, a collector, and a base; and means for normally biasing said second resistor in a selected conduction state of two possible conduction states of substantially full conduction and no conduction; and a coupling circuit connected between the collector of the second transistor and the base of the first transistor to control the operation of the first transistor in response to the conduction state of said second transistor, the coupling circuit comprising a first capacitor, a second capacitor, and a variable resistor, the first capacitor being connected between the collector of the second transistor through the whole of the variable resistor to said source of potential, the second capacitor being connected from the collector of the second transistor through a variable portion of the variable resistor to the source of potential and from the collector of the second transistor to the base of the first transistor.

6. The combination in accordance with claim 5 wherein the coupling means includes a diode connected between the second capacitor and the junction point of the first capacitor and the variable resistor.

7. In a multivibrator having a variable delay time and a reset time, a pair of switches each having an input circuit and an output circuit, an alternating-current coupling means for determining the delay time of said multivibrator, said coupling means including a capacitive network comprising a variable resistor, a first capacitor connected in series with the whole of said variable resistor, a second capacitor connected in parallel with said first capacitor and a portion of said variable resistor, and means for connecting said first and second capacitors in parallel during said reset time, said delay time determined by the discharge path of the capacitive network, the value of the effective capacitance of said capacitive network and the voltage increment through which said capacitive network must change, a discharge path for said capacitive network connected through said variable resistor whereby a variation in said variable resistor will simultaneously control the effective capacitance of said capacitive network and the discharge current available for said capactive network.

References Cited by the Examiner

UNITED STATES PATENTS

| | | | |
|---|---|---|---|
| 2,680,231 | 6/1954 | Reed | 330—157 X |
| 2,800,586 | 7/1957 | Towner | 330—157 X |
| 2,945,966 | 7/1960 | Davenport | 307—88.5 |
| 3,068,406 | 12/1962 | Dellinger | 307—88.5 X |
| 3,153,153 | 11/1964 | Ladd | 307—88.5 |

FOREIGN PATENTS

| | | |
|---|---|---|
| 1,107,271 | 5/1961 | Germany. |
| 1,126,920 | 4/1962 | Germany. |

ARTHUR GAUSS, *Primary Examiner.*

M. LEE, J. JORDAN, *Assistant Examiners.*